2 Sheets--Sheet 1.

E. M. STEVENS.

Clothes-Wringers.

No. 5,964. Reissued July 7, 1874.

Witnesses,
W. J. Cambridge
J. E. Cambridge

Inventor,
Edgar M. Stevens,
Pr Teschemacher & Stearns,
Attorneys.

THE GRAPHIC CO. PHOTO-LITH. 39 & 41 PARK PLACE, N.Y.

2 Sheets--Sheet 2.

E. M. STEVENS.

Clothes-Wringers.

No. 5,964. Reissued July 7, 1874.

Witnesses,
W. J. Cambridge
J. C. Cambridge

Inventor,
Edgar M. Stevens,
Per Teschemacher & Stearns,
Attorneys.

THE GRAPHIC CO. PHOTO-LITH. 39 & 41 PARK PLACE, N.Y.

UNITED STATES PATENT OFFICE.

EDGAR M. STEVENS, OF BOSTON, MASSACHUSETTS.

IMPROVEMENT IN CLOTHES-WRINGERS.

Specification forming part of Letters Patent No. 35,115, dated April 29, 1862; reissue No. 5,964, dated July 7, 1874; application filed April 24, 1874.

*To all whom it may concern:*

Be it known that I, EDGAR M. STEVENS, of Boston, in the county of Suffolk and State of Massachusetts, have invented certain Improvements in Clothes-Wringing Machines, of which the following is a full, clear, and exact description, reference being had to the accompanying drawings, making part of this specification, in which—

Figure 1:
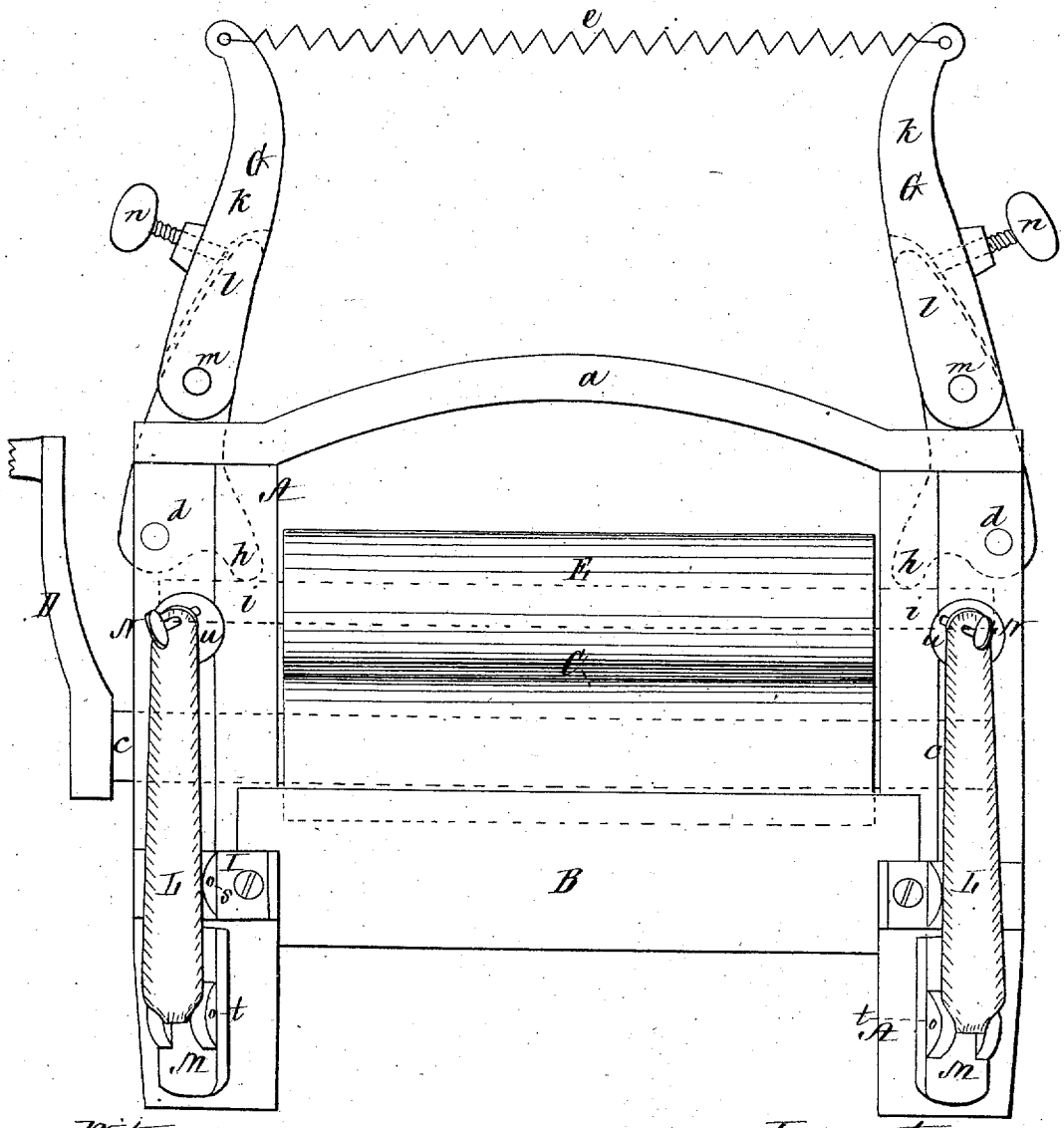
Figure 2:
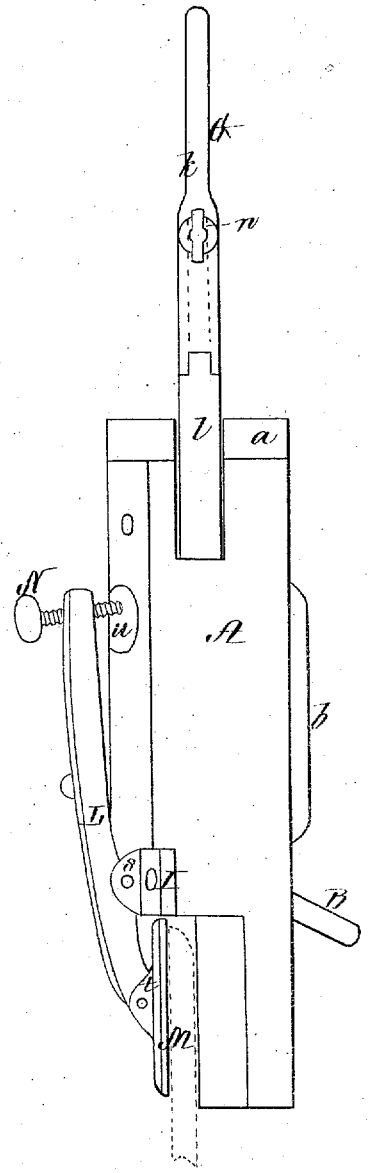
Figure 3:
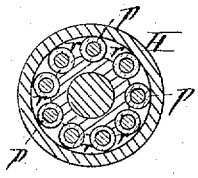

Figure 1 is a rear elevation of a wringing-machine constructed in accordance with my invention. Fig. 2 is an end elevation of the same. Fig. 3 is a transverse section through one of the rolls.

My invention consists in a clothes-wringing machine provided with an adjustable foot-piece, which will readily adapt itself to wash-tubs or receptacles of different shapes. My invention also consists in two pairs of jointed levers of peculiar construction, connected by a spring, for regulating the pressure of the upper roll upon the under one.

To enable others skilled in the art to understand and use my invention, I will proceed to describe the manner in which I have carried it out.

In the said drawings, A A are the upright portions of the frame, connected by a curved bridge-piece, *a*, extending across their tops, and by a straight bar, *b*, extending across their front. B is an inclined guide extending transversely beneath the rolls for conducting into the tub the water expressed from the clothes as they pass between the rolls. C is the lower roll, one extremity of its shaft *c* passing through one of the uprights A, and being provided with a crank, D, the other extremity of the shaft entering the opposite upright, as represented by the dotted lines in Fig. 1. E is the upper roll, the ends of the shaft of which turn in longitudinal slots in the uprights A A. This upper roll E is made to press upon the lower roll C, by means of levers G G, pivoted at *d*, in slots in the frame, and connected together at their tops by a spiral spring, *e*, which causes the projections *h* at the lower inner ends of the levers to bear forcibly down on the shaft *i* of the roll E, as seen dotted in Fig. 1. When the upper roll E is raised by the passage of clothes of considerable thickness thereunder, the upper ends of the levers G G will be thrown farther apart, and the spring *e* must be sufficiently stiff or rigid in order that the upper roll may be brought down with the required degree of pressure upon the clothes passing between it and the lower roll, and to regulate this pressure for clothes of varying thicknesses, I form the levers G G in two portions, *k l*, pivoted together at *m*, and turn a thumb-screw, *n*, through the portion *k*, against the portion *l*, by which construction the upper ends of the levers G G may be drawn nearer together, or made to separate more and more from each other, and the tension of the spring *e* may thus be adjusted, as desired.

The core or shaft of each roll C E is provided with grooves within which are placed strips, tubes, or solid cylinders of rubber *p*, in its plastic state, and surrounding these strips or cylinders *p* is a rubber tube, H, spaces *r* being thus formed between the core of the roll, two contiguous strips or cylinders, *p*, and the tube H, whereby the maximum of elasticity is obtained from the rubber employed and its permanent adhesion to the shaft insured. Within the outside of the back of each upright A is secured a metallic piece, I, to which is pivoted at *s* a lever, L, of the form seen in Fig. 2. To the lower end of each lever L, at *t*, is pivoted a foot-piece, M, the inner surface of which is slightly concave, so as to enable it to conform to the outside of a circular or other shaped tub or receptacle. Through the upper end of each lever L passes a thumb-screw, N, the end of which bears against a metallic disk, *u*, set into the upright.

From the foregoing description it will be seen that my adjustable foot-piece may be firmly secured to a tub regardless of its form, and removed therefrom in a ready and convenient manner.

I am aware that foot-pieces have been constructed to accommodate different sized peripheries of wash-tubs; but never the outside shape of the tub, as is the case with my invention.

What I claim as my invention, and desire to secure by Letters Patent, is—

1. In combination with a wringing-machine, an adjustable foot which accommodates itself to the shape of the vessel with respect to the incline of its sides, substantially as and for the purpose set forth.

2. In combination with the levers G G, formed in two parts and pivoted together, as shown, the spiral spring *e*, thumb-screw *n*, and shaft of the upper roller E, substantially as and for the purpose set forth.

Witness my hand this 21st day of April, A. D. 1874.

EDGAR M. STEVENS.

In presence of—
N. W. STEARNS,
P. E. TESCHEMACHER.